(12) United States Patent
Weston

(10) Patent No.: US 10,504,378 B1
(45) Date of Patent: Dec. 10, 2019

(54) MUSIC FINGERING AID

(71) Applicant: Toby John Weston, West Linn, OR (US)

(72) Inventor: Toby John Weston, West Linn, OR (US)

( * ) Notice: Subject to any disclaimer, the term of this patent is extended or adjusted under 35 U.S.C. 154(b) by 0 days.

(21) Appl. No.: 16/199,043

(22) Filed: Nov. 23, 2018

(51) Int. Cl.
*G09B 15/02* (2006.01)

(52) U.S. Cl.
CPC .................. *G09B 15/02* (2013.01)

(58) Field of Classification Search
CPC ..................................... G09B 15/02
USPC ........................................... 84/465
See application file for complete search history.

(56) References Cited

U.S. PATENT DOCUMENTS

| | | | | | |
|---|---|---|---|---|---|
| 346,424 | A * | 7/1886 | Burton | ...... | G10D 3/06 84/314 R |
| 494,698 | A * | 4/1893 | Zorger | ...... | G10D 3/06 84/314 R |
| 826,379 | A * | 7/1906 | Sprotte | ...... | G10D 3/06 84/314 R |
| 3,403,590 | A * | 10/1968 | Bernard | ...... | G09B 15/06 84/470 R |
| 3,783,731 | A * | 1/1974 | Pash | ...... | G09B 15/02 84/173 |
| 3,820,434 | A * | 6/1974 | Roberts | ...... | G09B 15/00 84/485 R |
| 3,978,756 | A * | 9/1976 | Feldman | ...... | G10D 3/00 84/470 R |
| 4,417,497 | A * | 11/1983 | Nicklaus | ...... | G09B 15/06 84/476 |
| D275,686 | S * | 9/1984 | Beasley | ...... | 84/314 R |
| 4,712,464 | A * | 12/1987 | Nance | ...... | G10D 3/06 84/453 |
| 4,807,509 | A * | 2/1989 | Graham | ...... | G10D 3/06 84/314 R |
| 5,345,851 | A * | 9/1994 | Aalfs | ...... | G10D 3/06 84/315 |
| 5,386,757 | A * | 2/1995 | Derrick | ...... | G09B 15/008 84/471 SR |
| 5,458,040 | A * | 10/1995 | Lawrence, Jr. | ...... | G09B 15/006 84/473 |
| 5,594,191 | A * | 1/1997 | Epstein | ...... | G09B 15/006 84/453 |
| 5,644,096 | A * | 7/1997 | Bull | ...... | G10G 1/02 84/471 SR |
| 5,920,023 | A * | 7/1999 | Ravagni | ...... | G09B 15/06 84/470 R |
| 6,218,603 | B1 * | 4/2001 | Coonce | ...... | G09B 15/06 84/470 R |

(Continued)

*Primary Examiner* — David S Warren
*Assistant Examiner* — Christina M Schreiber
(74) *Attorney, Agent, or Firm* — Williams Intellectual Property; Benjamin F. Williams

(57) ABSTRACT

An improved music fingering aid has at least one decal fittable overlying the fingerboard and attachable to the neck of a stringed instrument. The decal includes string identifier indicia, a graduated position indicia series, and a plurality of interval demarcations that employ distinct colors for visual distinction. The indicia do not pair particular notes with particular colors. Instead the improved music fingering aid associates music theory with muscle memory to ensure sounded notes are played in near perfect pitch and, when playing ensemble, in tempered pitch. Contemplation and improved association of music theory is thereby enabled.

18 Claims, 5 Drawing Sheets

(56) References Cited

U.S. PATENT DOCUMENTS

| | | | | |
|---|---|---|---|---|
| 6,452,080 | B1* | 9/2002 | Coonce | G09B 15/06 84/314 R |
| 6,483,018 | B2* | 11/2002 | Mead | G09B 15/003 84/470 R |
| 6,984,780 | B2* | 1/2006 | Reierson | G10D 3/06 84/291 |
| 7,115,806 | B2* | 10/2006 | Holland | G10G 1/02 84/454 |
| 7,408,105 | B2* | 8/2008 | Murdock | G10G 1/02 84/314 R |
| 8,399,756 | B1* | 3/2013 | Trent | G10D 3/06 84/314 R |
| 8,664,502 | B2* | 3/2014 | Kellner | G09B 15/06 84/477 R |
| D735,801 | S* | 8/2015 | Stone | D17/20 |
| 10,121,458 | B1* | 11/2018 | Giuriati | G10G 1/02 |
| 2002/0011142 | A1* | 1/2002 | Mead | G09B 15/003 84/477 R |
| 2002/0117043 | A1* | 8/2002 | Powley | G09B 15/02 84/483.2 |
| 2005/0072292 | A1* | 4/2005 | Ellestad | G09B 15/06 84/485 R |
| 2005/0126368 | A1* | 6/2005 | Harrison | G09B 15/001 84/471 R |
| 2006/0272472 | A1* | 12/2006 | Lacelle | G09B 15/02 84/314 R |
| 2007/0175310 | A1* | 8/2007 | Murdock | G10G 1/02 84/314 R |
| 2008/0163742 | A1 | 7/2008 | Oliver | |
| 2009/0266223 | A1* | 10/2009 | Tashima | G09B 15/026 84/485 R |
| 2010/0132535 | A1 | 6/2010 | Deverich | |
| 2012/0167746 | A1* | 7/2012 | Jacobsen | G09B 15/008 84/477 R |
| 2014/0318145 | A1 | 10/2014 | Fraser et al. | |
| 2014/0318345 | A1* | 10/2014 | Fraser | G10G 1/02 84/314 R |
| 2016/0071430 | A1* | 3/2016 | Claps | G09B 15/023 84/485 R |
| 2016/0125752 | A1* | 5/2016 | Rhodes | G09B 15/003 84/471 R |
| 2018/0061266 | A1* | 3/2018 | Badilla-Bradford | G09B 15/004 |
| 2018/0218633 | A1* | 8/2018 | Jacobsen | G10D 1/08 |
| 2018/0308380 | A1* | 10/2018 | Borko | G09B 15/023 |

* cited by examiner

MUSIC FINGERING AID

BACKGROUND OF THE INVENTION

Various types of fingering aids for musical instruments are known in the prior art. Most include multi-colored indicia that associate finger position for a particular note or interval with a particular, repeating color. Associating colors and sounds does not associate the actual theory of the chromatic scale but rather reinforces facility and ease absent a conceptual framework informing the music. Other devices in the prior art simply position indicia illustrating note names beneath the strings of stringed instruments. But these prior art also fail to properly associate the musical theory underpinning the chromatic scale; by simply illustrating a note's position the student simply searches for the requisite letter and places a finger there. The relationship of notes may or may not be associated beyond a simple seek-and-find mentality whereby the semitone intervals between notes and the relative arrangement of scales over repeating intervals are often overlooked.

Additionally, devices extant in the prior art typically identify particular frets with which to associate the particular note or, on fretless instruments, the general area where the note may be sounded. However, a range of finger positions upon and around such notations may not consistently render tones in tune or sound in perfect pitch. Oftentimes a student's finger may be misaligned when stopping an associated string. A marginal distance off an exact position affects the tunefulness of the note played, even if only nominally by several microtones. However, when playing in ensemble, or in orchestra, these minor deviations of position can constructively and deconstructively interfere harmonically to become the difference between a pleasing euphony and an unpleasant experience. This is often the case with younger performers who, while playing instruments nonetheless tuned correctly, oftentimes habitually position their fingers to stop the strings slightly deviated from perfect pitch.

What is needed, therefore, is an improved music fingering aid that includes a decal securable to the fingerboard of a stringed instrument in a position underlying the strings to identify finger positions that are articulated to stop the overlying string and sound perfect pitch as well as to associate musical intervals relatively, to reinforce hand-to-ear association, rather than simply identify single notes. The instant invention, therefore, includes a decal having an upper surface whereon string identifier indicia, a graduated position indicia series, and a plurality of interval demarcations collectively instill music theory and associate notation with the act of playing the instrument and sounding the notes, while guiding play of the instrument thereby. A decal extension is included to optionally extend the demarked finger positions upon the finger board of the associated stringed instrument at least up to the seventh position. A simplified decal is included to expedite instruction for strings sections for ensemble play.

FIELD OF THE INVENTION

The present invention relates to an improved music fingering aid, and more particularly, to an improved music fingering aid that more accurately associates finger positions when playing stringed instruments accordant to underlying music theory that informs the chromatic scale.

The present improved music fingering aid minimalizes color-coding and coloration of finger positions in preference to particular string identifier indicia, a graduated position indicia series, and a plurality of interval demarcations which are distinctly and brightly colored, but articulated to illustrate music theory and the arrangement of steps and half-steps that create the modes and scales of Western musical expression. Position is illustrated to associate position of the index finger with a set of intervals and temperament of the strings is also illustrated to enable play ensemble, as desired.

The improved music fingering aid, therefore, serves as a guide to playing a stringed instrument, as a teaching aid, as well as associative aid to associate music theory with accurately placed fingers, finger position proper, and the corresponding notes sounded in near perfect pitch or tempered pitch, as case may be.

SUMMARY OF THE INVENTION

The present improved music fingering aid has been devised to assist students in learning musical fingering of stringed instruments. The present improved music fingering aid utilizes associable shapes and colors to imprint musical notation into the mind of a student playing a stringed instrument and thereby associates the musical notation with muscle memory articulating correct finger position. The present improved music fingering aid further enables competent placement of fingers to effect temperament of pitch, while playing in ensemble for example, and adjust the frequency of the notes played accordingly. The term "musical notation" or "notation", as used herein throughout, should be taken to include non-lettered notation employed in demarking the notes of a scale, such as the syllables used in solfège, for example.

The present improved music fingering aid minimizes color-coding, focusing instead on visual distinctness of particular fingering positions that are associable with musical theory in relative position along the chromatic scale, rather than some complex color-coded map as is frequently seen in the art. Complex color-coding, whereby a note is represented by a specific color repeatedly throughout the chromatic scale for rapid identification and association, generally associates the color proper with the finger position rather than the precise musical notation or chromatic interval. This is particularly problematic when considering association of semitones playable as sharps and flats and rendered relative to the preceding and succeeding tones as illustrated on the staff of sheet music, or when tempering of the notes is required when playing ensemble.

Other notations seen in the art readily identify a fret, for example, or broadly identify an area upon a fingerboard whereon a note may be sounded equivalent to the note's name. However, small deviations from exact placement of a player's finger can offset tonality by even a few microtones which, when playing in ensemble, can magnify causing otherwise euphonic arrangements to sound slightly out of tune and therefore displeasing. Accurate placement of the finger may likewise produce cacophony when tempering of the string is required to avoid dissonant interference arising in the complex waveform of the musical ensemble. Such a situation is readily discerned among younger players who, despite having instruments rendered in tune, often nonetheless sound out of tune when playing in ensemble due to even slightly incorrect positioning of their fingers and the interference of microtonal variance displayed between modern instruments tuned in equal temperament, for example. Children typically have smaller fingers which can compound microtonal variance as they are capable of stopping the string in more precise locations around the correct position that produces perfect pitch or a tempered pitch, as case may be.

The present improved music fingering aid, therefore, has been devised to more accurately associate musical notation and the chromatic intervals with corresponding fingering of the musical instrument and thus better teach musical theory for students using the present improved music fingering aid. Further, the indicia used in articulating the finger positions are visually distinct without relying on a system of color-coding while illustrating the movements along the fingerboard that correspond to musical theory. Further, a plurality of interval demarcations accurately aligns underlying the strings denoting a particular area wherein perfect pitch and tempered pitch may be sounded. A student therefore playing a note is shown a finger position in scale that sounds a note in tune and tempered for ensemble play. Small deviations to accommodate individual instruments are afforded since each interval demarcation includes an area denominated by a distinctly colored outline wherein a finger position may be slightly adapted and conceptually identified by a student and therefore applied across the fingerboard in sounding each note upon the particular instrument. Temperament is likewise enabled by illustrating a range of positions across a single indicium for example. Associating perfect pitch with fingering and the name of the note played is helpful in developing skill and self-determination in learning to play an instrument, while enabling temperament of notes when playing ensemble. The student codes the associated letter name, the correct finger position, and an understanding of the chromatic scale from the onset of learning to play. Thus musical theory is inculcated more effectively by use of the instant improved music fingering aid that presently seen in the art.

The instant improved music fingering aid, therefore, includes a decal having an upper surface, a bottom surface, a topmost edge, a bottommost edge, a first side edge, and a second side edge. The decal is sized exactly to fit to a particular stringed instrument (such as for example a violin, a viola, a cello, a double bass, and proportionately sized variants of said instruments, for example) with intervals spaced precisely appropriate for stopping the instrument's strings at near-exact proportions to create sounding of perfect and tempered pitch. The intervals spacing is not necessarily constant, and the spacing may vary to accommodate tempering and position up the neck of the stringed instrument. (For example, indicia aligned with the second and second-and-one-half positions are spaced relatively closer to the immediately preceding row than the other intervals demarked. This assists in instructing for ensemble play by tempering notes elicited in those positions.)

The decal is contemplated to be rendered of a very thin film. The topmost edge abuts the top nut of the stringed instrument and each of the first and second side edges overlie the neck of the stringed instrument aligning either side of the fingerboard. To enable a better fit atop the fingerboard (which is often slightly convex) and to facilitate overlaying onto the neck on either side of the fingerboard, the decal includes a pair of top corner edges and a pair of bottom corner edges. Each of the pair of top corner edges is disposed at an oblique angle between the topmost edge and a corresponding one of the first or second side edges. Likewise the pair of bottom corner edges is similarly disposed at oblique angles between the bottommost edge and a corresponding one of the first and second side edges. The pair of top corner edges and the pair of bottom corner edges therefore create a diagonal portion of the decal that crosses over the edges of the fingerboard for engagement of each of the first side edge and the second side edge upon the neck proper of the instrument. The diagonals created by the pair of top corner edges and the bottom corner edges help prevent bubbling and uneven securement of the decal to the fingerboard and to the neck of the instrument while maintaining minimal contact along the sides of the neck to ensure even application and ideal placement of the decal to the fingerboard, which is vital in ensuring accurate sounding and tempering of the notes.

The upper surface includes string identifier indicia, a graduated position indicia series, and a plurality of interval demarcations. These collectively signal to a user the semitone intervals that define the chromatic scale of Western music and the correct finger position is determinable by position of brightly colored square indicia that accommodate a finger position to sound a corresponding note at least 99% in tune when the overlying string is stopped within the center of the outlines of each respective brightly colored square indicium, as will be described subsequently. Temperament is relatively discernable by stopping a string off-center upon said square indicia.

String identifier indicia are serried transversely across the upper surface most proximal the topmost edge. The string identifier indicia are spaced appropriate to underlie each of the stringed instrument's strings and include brightly colored chevrons. The base of each chevron approximately abuts the top nut of the stringed instrument. Each chevron includes a distinctly colored outline and orients an apex pointing toward the stringed instrument's bridge. Interior to each chevron, a distinctly colored letter is demarked. The color of the letter and the color of the outline are contemplated in most embodiments to be the same color. The color of the chevron is contemplated to be a distinct color relative the outline and the letter. For example, the chevron may be a fluorescent yellow (for visual distinctness) and the outline and letter may be a fluorescent blue (for visual contrast). In all embodiments, the color of each chevron is consistent between chevrons and is distinct the color of the outline and the letter. Each string identifier therefore identifies the name of the overlying string, corresponding to the name of the note played when the overlying string is struck without being stopped upon the fingerboard (i.e. when each string is played open).

The graduated position indicia series is disposed longitudinally upon the upper surface most proximal the first edge. The graduated position indicia series includes a plurality of indicia demarking semitones in longitudinal series along the fingerboard, proximal the first edge between the topmost edge and the bottommost edge. In the preferred embodiment contemplated herein, the plurality of indicia are enumerated as Roman numerals marking full stepped intervals and minor seconds corresponding to the first through the fourth position, with a fractional indicator appending the numeral at each half-step (with the exception of the minor seconds). The graduated position indicia series, therefore, articulates the chromatic intervals upon the upper surface of the decal longitudinally and proximal the first side edge. The graduated position indicia series guides the player in shifting between positions and provides a visual cue to associate correct positioning between the positions enumerated. In the example embodiment herein disclosed, the graduated position indicia series includes the following indicia as disposed for the strings of a violin (G, D, A, and E strings) shown in Table 1 with the corresponding quality and number the interval elicits transversely relative the graduated position indicium and relative the overlying strings. The corresponding notes played when the string is stopped at a corresponding brightly colored square indicium aligned transversely relative to the particular graduated position indicium is also shown. Please see Table 1 below.

TABLE 1

| Indicia: | (Open) | ½ | I | II | II½ | III | III½ | IV |
|---|---|---|---|---|---|---|---|---|
| Quality/Number: | P1 | m2 | M2 | m3 | M3 | P4 | A4/d5 | P5 |
| G String: | G | G♯ A♭ | A | A♯ B♭ | B | C | C♯ D♭ | D |
| D String: | D | D♯ E♭ | E | F | F♯ G♭ | G | G♯ A♭ | A |
| A String: | A | A♯ B♭ | B | C | C♯ D♭ | D | D♯ E♭ | E |
| E String: | E | F | F♯ G♭ | G | G♯ A♭ | A | A♯ B♭ | B |

Spacing between each of the graduated position indicia series is not necessarily constant. In the example embodiment depicted herein, devised for use with a violin particularly, the indicium illustrative of the second position (depicted herein by the Roman numeral II) and the indicium illustrative of the third position (depicted herein by the Roman numeral III) are spaced relatively closer to the immediately preceding indicium. This adjustment of relative spacing between the indicia corresponding to the second and third position accommodates tempering of notes played in the second and third position, as desired for instruction and for ensemble play, as will be explained hereinbelow.

The plurality of interval demarcations is disposed upon the upper surface in longitudinal series underlying each of the strings of the particular stringed instrument to which the decal is attached. The plurality of interval demarcations is further disposed serried transversely aligned with each of the plurality of indicia comprising the graduated position indicia series, whereby the steps and position in scale of each transversely aligned interval demarcation is discernible. The plurality of interval demarcations includes brightly colored square indicia disposed to demark the correct position for a user to stop the overlying string within perfect pitch and/or tempered pitch at each position in scale corresponding to a natural tone. Tempering is achieved by adjusting the finger position to stop the overlying string either off-center of a particular interval demarcation or, where the interval demarcation is already positioned to elicit tempered pitch (as exemplified for the second position and second-and-one-half position above), by stopping the string central to the demarcation. Thus adjustment of the finger position atop the demarcation is afforded to sharpen or temper pitch and therefore associate tuneful play (whether solo or ensemble) with the ear of the player. Thus sensual association and contemplation of sounds are elicited by the present improved music fingering aid as opposed to simple rote finger mechanics, as more frequently seen in the art.

Similar to the chevrons of the string identifier indicia, each brightly colored square indicium includes a distinctly colored perimeter outline and a distinctly colored letter centered therein. Each distinctly colored letter corresponds to the natural note sounded when each corresponding overlying string is stopped at the particular brightly colored square indicium in question. Each brightly colored square indicium therefore encloses an area defining a finger position to sound perfect pitch or tempered pitch, depending on the position wherein the note is elicited. Slight variations of finger position interior to each brightly colored square indicium are enabled to accommodate for the variance of individual instruments, allowing a player to determine the correct position to elicit a desired pitch. Stopping the overlying string off-center but still upon an underlying brightly colored square indicium (such as towards the perimeter closest the top nut, for example) illustrates fingering appropriate to accommodate tempering of the note played and to allow for ensemble play, where equal temperament instruments otherwise may become dissonant.

Semitones between natural notes are indicated by distinctly colored circle indicia. Each distinctly colored circle indicium is disposed at semitone intervals relative a natural note and thereby denotes a sharp or flat relative to the immediately preceding or succeeding natural note respectively. The distinctly colored circle indicia are contemplated to be a single color distinct the color of the brightly colored square indicia and the string identifier indicia. The distinctly colored circle indicia may be the same color as the distinctly colored outline of the chevrons and/or the distinctly colored perimeter outline of the brightly colored square indicia.

A directional indicium is disposed upon the upper surface of the decal most proximal the first edge. The directional indicium illustrates which direction a player should move along a string to sound a flat or sharp relative a natural note signified by each brightly colored square indicium. Thus, when using the present improved music fingering aid, a student naturally associates the position of their finger with the correct position within the chromatic scale as a whole (and not just the position to make a sought note). Sharps and flats are thereby associated in relation to the position of natural notes. A student therefore associates music theory with the notes played and the muscle memory creating those notes, and does not associate a particular color with a particular note or a single position upon the fingerboard, but rather each note is reinforced as part of an integrated whole.

A beginner version of the instant decal is contemplated in the present disclosure, a beginner version that includes a decal having a simplified representation thereupon for use by beginner musicians learning the particular stringed instrument. In the example embodiment contemplated herein, the beginner version is devised for use with a violin. In this beginner version, the string identifier indicia identify only three strings and the interval demarcations demark only the scale of D major.

In string sections, the violin, viola, cello, and bass all share the D and A strings, thus utilizing a scale that sounds notes across these two strings predominantly further enables concert playing as part of an ensemble with minimal skill and represents a good introduction to learning the strings in ensemble. In the beginner version, the distinctly colored circle indicia are omitted, and F and C are depicted in brightly colored square indicia to assist initial comprehension and association of the scale tones in sounding perfect pitches.

An extension decal is further included to optionally extend the finger positions through at least the seventh position up the fingerboard. The extension decal is attachable overlying the fingerboard in like manner as the decal previously described, only instead of abutting the top nut of the particular stringed instrument to which it is applied, an uppermost edge is disposed to immediately abut the bottommost edge of the previously installed decal. In like manner, the extension decal demarks finger positions up through at least the seventh position.

Thus has been broadly outlined the more important features of the present improved music fingering aid so that the detailed description thereof that follows may be better understood and in order that the present contribution to the art may be better appreciated.

Objects of the present improved music fingering aid, along with various novel features that characterize the invention are particularly pointed out in the claims forming a part of this disclosure. For better understanding of the improved music fingering aid, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
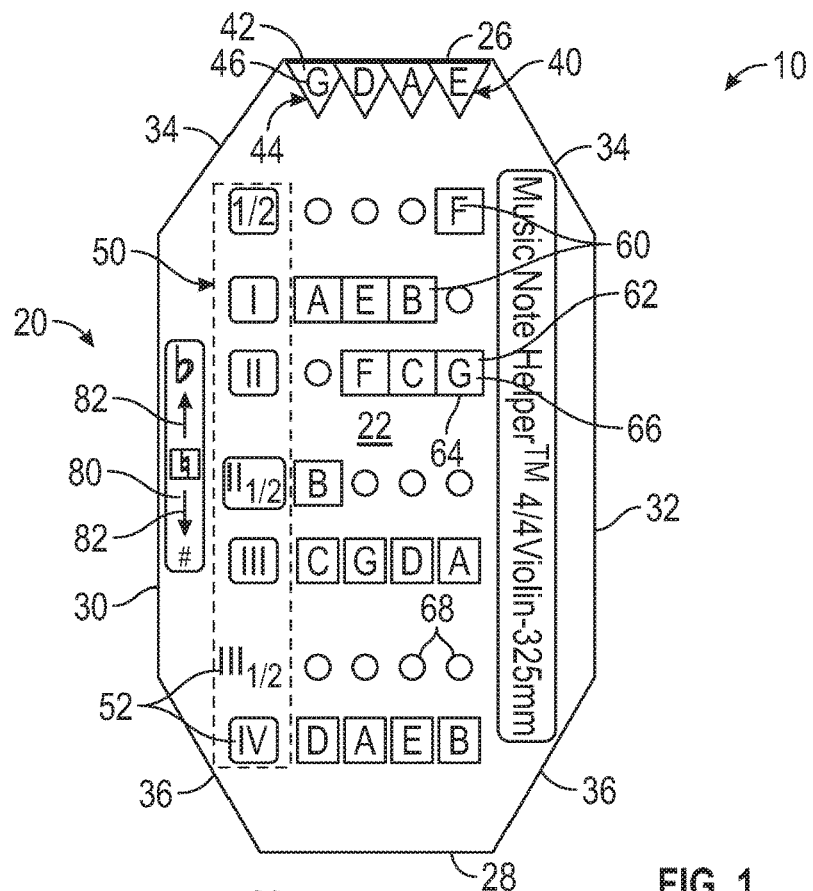
FIG. 1 is a front elevation view of an example embodiment of an improved music fingering aid.
Figure 2:
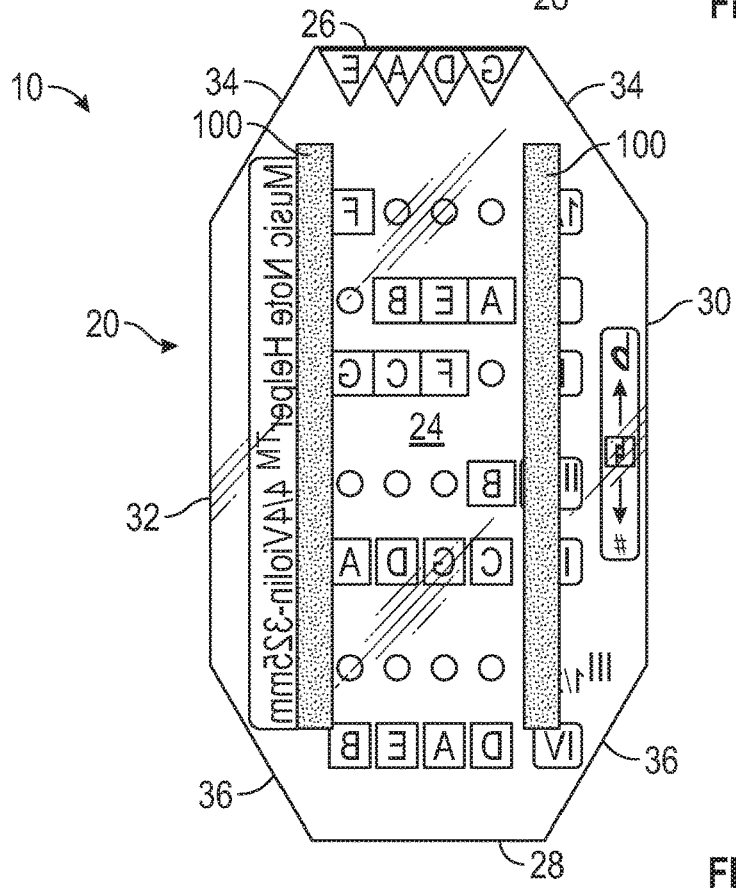
FIG. 2 is a rear elevation view of an example embodiment of the improved music fingering aid showing strips of adhesive disposed to engage the music aid to the neck of a stringed instrument.

With reference now to the drawings, and in particular FIGS. 1 through 8 thereof, example of the instant improved music fingering aid employing the principles and concepts of the present improved music fingering aid and generally designated by the reference number 10 will be described.

Referring to FIGS. 1 through 8 example embodiments of the present improved music fingering aid 10 is illustrated attached to the neck of a violin. However, as will be appreciated by a person having ordinary skill in the art, the instant improved music fingering aid 10 is devised for use with multiple types of stringed instruments (for example violin, viola, cello, bass, among others, as well as different sized and scaled versions of the same instrument) wherein the indicia disposed upon the decal (described below) are spaced appropriate to enable the instant invention 10 for use with a particular stringed instrument upon which it is attached, as applied hereinbelow and in the figures as exemplified upon a violin.

The figures here represented, and this detailed description thereof, are not intended to limit application of the instant improved music fingering aid 10 to a particular embodiment shown herein or to a particular stringed musical instrument proper, but rather to exemplify the metes and bounds of the inventive step whereby a person of ordinary skill in the musical arts will be enabled to reduce the invention to practice for use with any fretless stringed instrument.

An improved music fingering aid 10, therefore, is attachable to a neck 72 of an existing stringed instrument 70 upon a fingerboard 74 underlying strings 76 thereon. The improved music fingering aid 10 is disposed to fit upon the fingerboard 74 of the existing stringed musical instrument 70 abutting the top nut 78 to lay upon the fingerboard 74 underlying the strings 76 of the instrument 70 to demark points of the chromatic scale positioned appropriate to the size of the particular stringed instrument 70 (see for example FIG. 2).

As shown in FIG. 1, the improved music fingering aid 10 includes an irregular octagonal shaped decal 20 that has an upper surface 22, a bottom surface 24, a topmost edge 26, and a bottommost edge 28 disposed in parallel with the topmost edge 26. A first side edge 30 is disposed perpendicularly relative the topmost and bottommost edges 26, 28 and a second side edge 32 is disposed in parallel with the first side edge 30. To enable flush contact of the decal 20 upon the fingerboard 74, to wrap each of the first side edge 30 and the second side edge 32 overlying the edges of the fingerboard 74 upon the instrument's neck 72, a pair of top corner edges 34 is disposed connecting the topmost edge 26 to the first and second side edges 30, 32. Each of said top corner edges 34 is disposed at an oblique angle connecting the topmost edge 26 to a respective one of the first side edge 30 and second side edge 32. In like manner, a pair of bottom corner edges 36 is disposed divergently from the bottommost edge 28 to connect to the first and second side edges 30, 32; each of said pair of bottom corner edges 36 likewise disposed at an oblique angle connecting the bottommost edge 26 to one of the first side edge 30 and the second side edge 32. The diagonal created by each pair of corner edges 34, 36 enables better fit of the decal 20 wrapped to the neck 72 of the instrument 70 while maintaining flush contact overlying the fingerboard 74 proper.

A plurality of string identifier indicia 40 is disposed upon the upper surface 22 of the decal 20, each of said plurality of string identifier indicia 40 disposed most proximal the topmost edge 26, and thereby proximal the nut 78 of the instrument 70, in an appropriate position to underlie a corresponding string 76 of the existing stringed instrument 70. Each of the plurality of string identifying indicia 40 includes a brightly colored chevron 42 having a distinct colored outline 44 to demark the chevron 42 visually distinct. Placement of the decal 20 onto the fingerboard 74 is facilitated by aligning the plurality of string identifying indicia 40 with each overlying string 76. The base of each chevron 42 proximately abuts the top nut 78 of the instrument and the apex of each chevron 42 points down the fingerboard 74. Each chevron 42 is positioned and spaced apart upon the upper surface 22 of the decal 20 to immediately underlie a corresponding string 76 of the stringed instrument 70, with the string 76 aligned bisecting each said chevron 42. The note sounded, therefore, when the particular string 76 is played open is denoted and the tonic of the string's range is elicited.

Each chevron 42 comprises a first color. A distinctly colored letter 46 is disposed interior to the chevron 42 in contrast to the first color, said letter 46 corresponding to the name of the overlying string 76. Thus each chevron 42 brightly identifies each string 76 in a visually acute and contrasted manner to signal the string name (and the tonic of the string) to a user wielding the stringed instrument 70 in play. In an example embodiment contemplated herein the first color contemplated is fluorescent orange and the perimeter is fluorescent blue. This contrast of fluorescent colors demarks the chevrons 42 acutely and readily enables visual apprehension of the letter 46 within each chevron 42. In all embodiments contemplated, this or a similar visual distinctness is contemplated.

A graduated position indicia series 50 is disposed upon the upper surface 22 in parallel with and immediately proximal to the first side edge 30. The graduated position indicia series 50 includes a plurality of indicia 52 demarking semitonal steps of the chromatic scale corresponding to positions half through four. Each of said indicia is therefore indicative of the frequency ratios that correspond to the length of the string 76 when stopped at a place transversely aligned with each of said plurality of indicia 52 which correspondingly demark the finger positions for shifting along the fingerboard when playing. In the example embodiment contemplated herein, each of the plurality of indicia 52 comprising the graduated position indicia series 50 is configured as a Roman numeral for each finger position and a Roman numeral appended with a ½ symbol to denote half positions.

In the example embodiment depicted, the spacing demarked by the graduated position indicia series is not necessarily constant. For example, in the example shown, the indicium illustrated by the Roman numeral II is disposed relatively closer to the immediately preceding indicium in the series than the spacing between the indicium illustrated as ½ and the indicium illustrated as a I. In like manner, the indicium illustrated as the Roman numeral III is disposed relatively closer to the indicium illustrated as II½. This inconstant spacing is devised to enable tempered playing of notes elicited by the second and third positions, as will be described subsequently. This inconstant spacing is important for instructional reasons and facilitates ear-to-hand articulation of the instrument and playing ensemble play.

A plurality of interval demarcations 60 is disposed upon the upper surface 22 of the decal 20 longitudinally underlying each string 76 of the existing stringed instrument 70, serried transversely aligned with a corresponding one of the plurality of indicia 52 of the graduated position indicia series 50. Each of the interval demarcations 60 includes brightly colored square indicia 62 of a second color. Each of the brightly colored square indicia 62 includes a distinctly colored perimeter outline 64. Each of the brightly colored square indicia 62 is disposed at full-stepped intervals (and half-stepped intervals when corresponding to denote minor seconds) and contains a distinctly colored letter 66 that enumerates each natural musical note as played when the string 76 overlying the corresponding brightly colored square indicium 62 is stopped by a user resting their finger upon each said letter 66. The position of each of the brightly colored square indicia 62 is rendered precisely appropriate to the particular stringed instrument 70 to ensure issuance of perfect pitch from a string 76 stopped at the particular indicium 62 centrally within the bounds of the respective brightly colored square. In the example embodiment included herein, the second color is fluorescent yellow and the distinctly colored perimeter outline 64 is fluorescent blue. In all embodiments contemplated, this or a similar visual distinctiveness is maintained.

Distinctly colored circle indicia 68 of a single color are disposed underlying the strings 76 between the brightly colored square indicia 62, there positioned to identify semitones discernible as sharps and flats between full-stepped intervals, other than natural notes playable as minor seconds. Each distinctly colored circle indicium 68, therefore, enumerates a sharp or flat note as played when the string 76 overlying the corresponding distinctly colored circle indicium 68 is stopped by a user resting a finger upon each said distinctly colored circle indicium 68.

The spacing between each of the plurality of interval demarcations 60 is not necessarily regular and repeating. The spacing between each of the plurality of interval demarcations 60 is relative to the particular position upon the neck of the particular instrument played thereby to correspond with a producible tone. Further, temperament of each note produced is visually cued by stopping each string 76 in a relative position upon each demarcation 60 corresponding to the temperament desired. In an example embodiment contemplated herein, the interval demarcations 60 aligned with the second finger position (indicated by the Roman numeral II in the graduated position indicia series 50) are rendered closer to the preceding row of the plurality of interval demarcations 60 aligned with the graduated interval indicium 50 represented in the example embodiment illustrated by the Roman numeral I than in the preceding intervals represented by the indicia in general. Likewise, the interval demarcations 60 aligned with the third finger position (indicated by the Roman numeral III in the graduated position indicia series 50) are spaced relatively closer to the second-and-one-half position (illustrated by the Roman numeral II and the fraction ½ in the graduated position indicia series 50). This change in the relative distance between rows of the indicia is purposeful and best matches the instructional practices of string instrument teachers in causing pitch accuracy in playing the instrument. Additional space variance is contemplated between rows of the indicia to best correspond with temperament of pitch in ensemble play for instructional purposes.

A directional indicium 80 is disposed upon the upper surface 22 of the decal 20 most proximal the first side edge 30 in a position discernible by a user playing the stringed instrument 70. The directional indicium 80 is disposed to appear upon the neck 72 of the existing stringed instrument 70 adjacent to the fingerboard 74, said directional indicium 80 including directional indicators 82 significant of the direction moved along a string 76 to sound flats or sharps playable relative to any particular brightly colored square indicium 62. Thus a user is apprised of any natural note by each brightly colored square indicium 62 and is sensible of the immediately preceding flat or succeeding sharp by reference to the directional indicium 80 that signals the direction the user need move along the string 76 to issue a flat or sharp, as desired, or to temper the note played appropriately.

Thus the decal 20 is sized to fit to the fingerboard 74 of the existing stringed instrument 70 to demark musical scales in semitones playable thereupon. Each of the plurality of interval demarcations 60 enables a player to stop the strings 76 appropriately to produce tonal frequencies equivalent to the notes demarked underneath the strings 76 and to temper the notes played by stopping the overlying string off-center relative the center of the relevant, underlying indicium.

Figure 3:
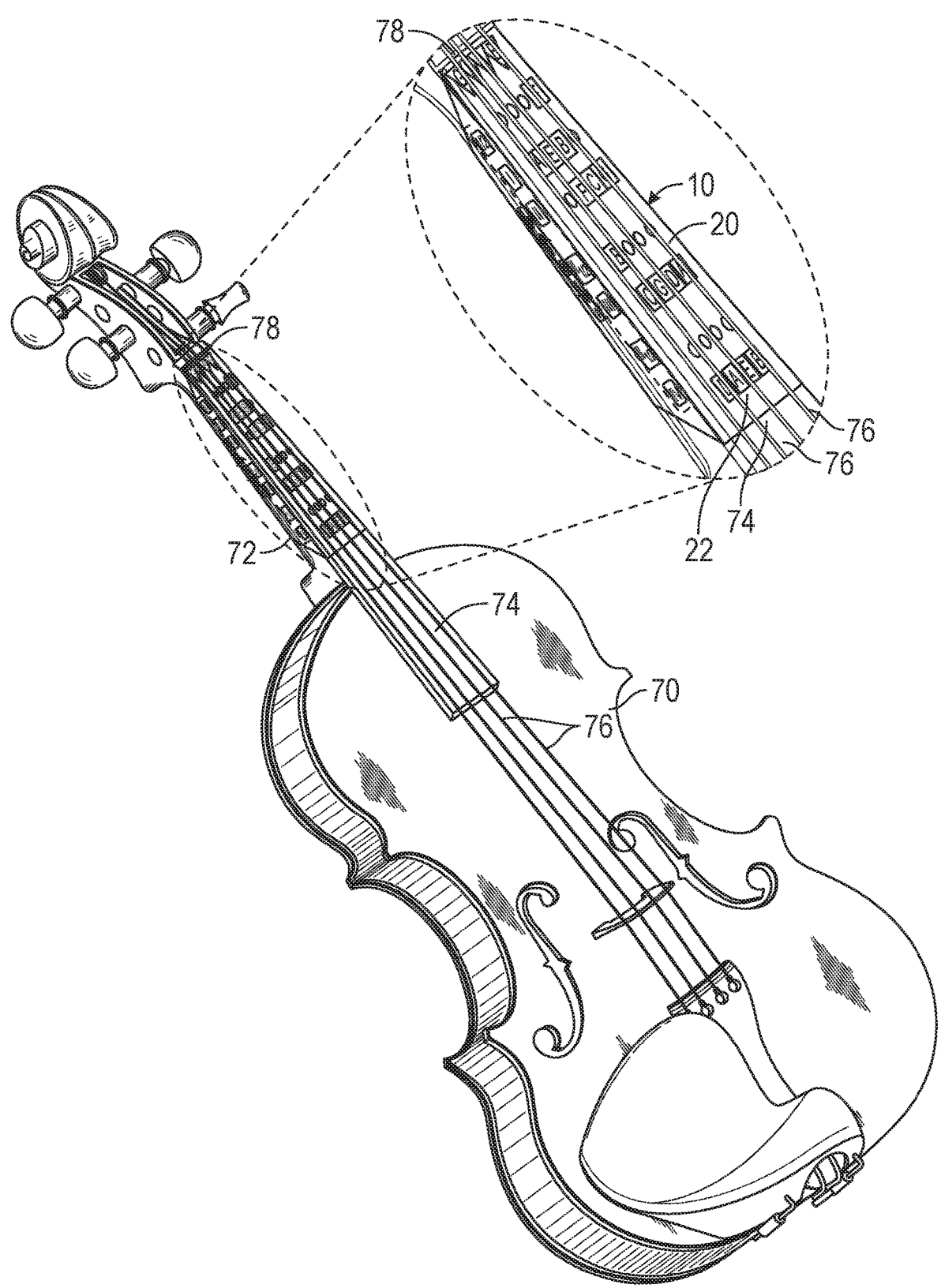
FIG. 3 is an isometric in-use view of an example embodiment of the improved music fingering aid installed upon the neck of a violin.

In one embodiment contemplated herein, the decal 20 adheres to the fingerboard 74 by action of an adhesive 100 disposed upon the bottom surface 24. The adhesive 100 is contemplated to be a weak adhesive which enables ready removal of the decal 20 without damaging the neck 72 or fingerboard 74 of the stringed instrument 70. In another embodiment as shown in FIG. 3, the adhesive 100 is disposed upon the bottom surface 24 of the decal 20 in longitudinal strips proximal the first and second edges 30, 32, whereby the adhesive 100 secures to the neck 72 of the instrument 70 on either side of the fingerboard 74. In this embodiment, the adhesive 100 is similarly a weak adhesive to enable ready removal without leaving a residue or damaging the neck 72 of the instrument 70. In a third embodiment, shown in FIGS. 7 and 8, the decal 20 is contemplated to be attachable to the neck 72 of the instrument 70 by action of static cling; that is, contact between the decal 20 and the neck 72 and fingerboard 74 of the instrument 70 is maintained by electrostatic forces. In such an embodiment, side wings 38 of the decal 20 may be large enough to contact each other around the neck 72 of the instrument 70 to enable attachment by overlapping engagement together on the rear side of the instrument 70 neck 72.

Figure 5:
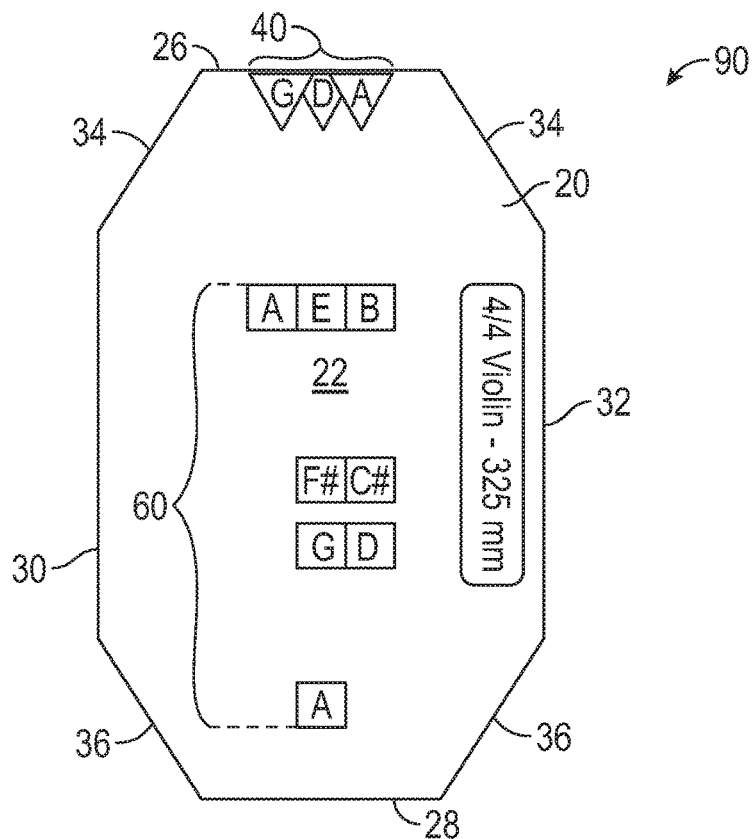
FIG. 5 is a front elevation view of an example embodiment of a beginner version of the improved music fingering aid.
Figure 6:
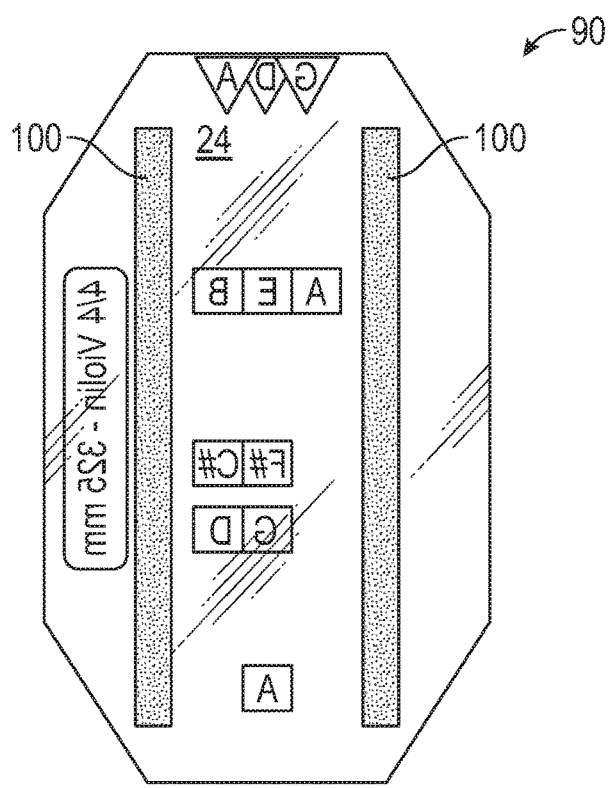
FIG. 6 is a rear elevation view of an example embodiment of the beginner version of the improved music fingering aid.
Figure 7:
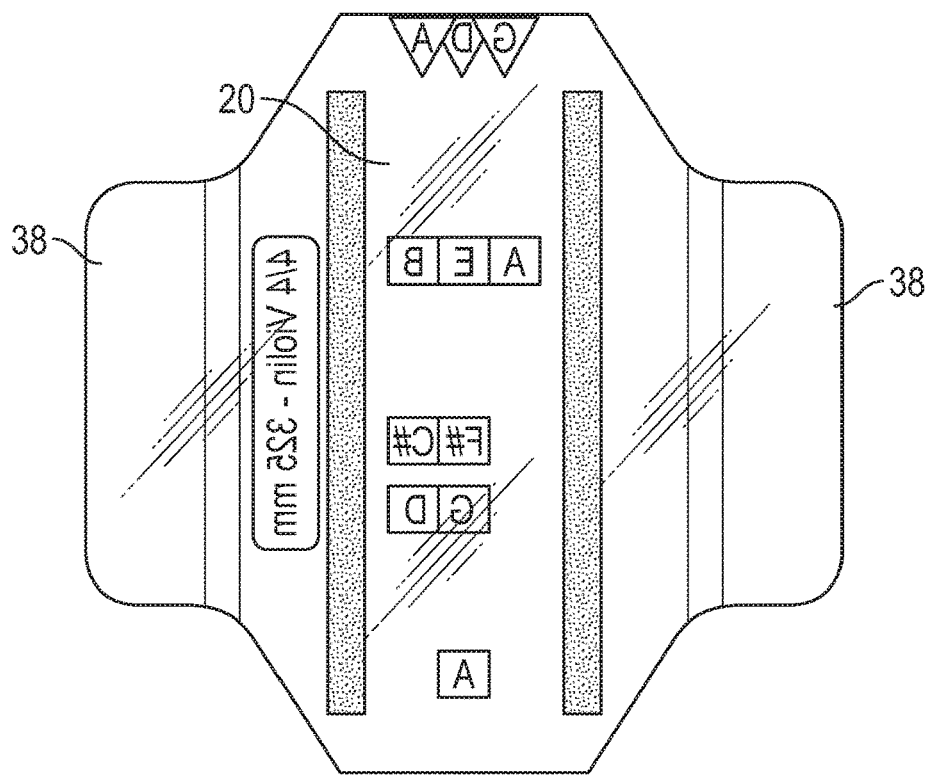
FIG. 7 is a rear elevation view of an example embodiment of a decal having side wings sized appropriate to overlap together on the rear side of the neck of an instrument to which the decal is fit.
Figure 8:
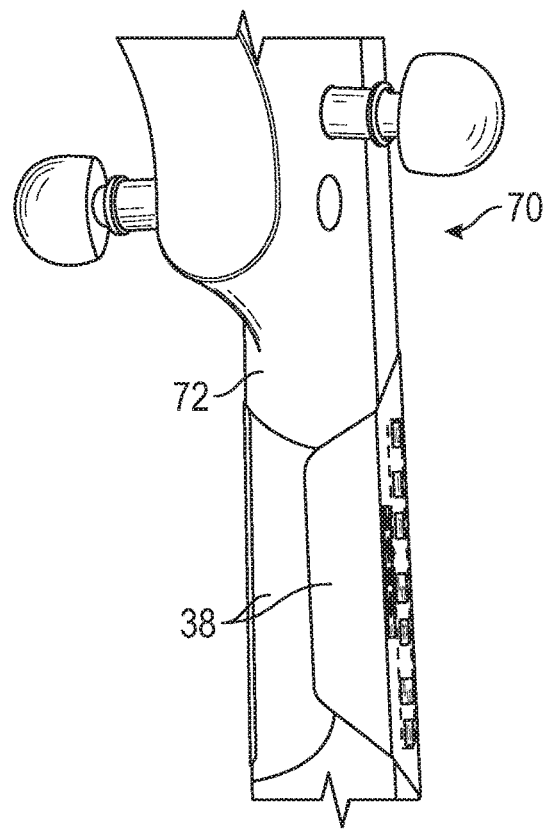
FIG. 8 is a rear elevation view of an example embodiment of the decal having side wings sized appropriate to overlap together applied to the neck of a stringed instrument.

As shown in FIGS. 5 and 6, a beginner version 90 is also contemplated as part of this disclosure. In the example embodiment illustrated in FIGS. 5 and 6, the beginner version 90 includes only three string identifier indicia 40 and a simplified plurality of interval demarcations 60 that demark notes comprising the D major scale. In heterogeneous instruction for the violin, viola, cello, and bass, the players all share the D and A strings. Thus teaching beginners to play together in string ensemble is facilitated by using music denoting the D major scale (for example, Mozart's String Quartet in D Major, K 575 Allegretto; Pachelbel's Canon in D major; Borodin's Quartet No. 2 in D major for strings; etc.) which provides for an inspirational experience or students learning to play together. Additional single scale decals are contemplated, for example a decal that denotes the A major scale (for use in violin instruction upon the A and E strings, for example, such as is seen in the Suzuki method).

Figure 4:
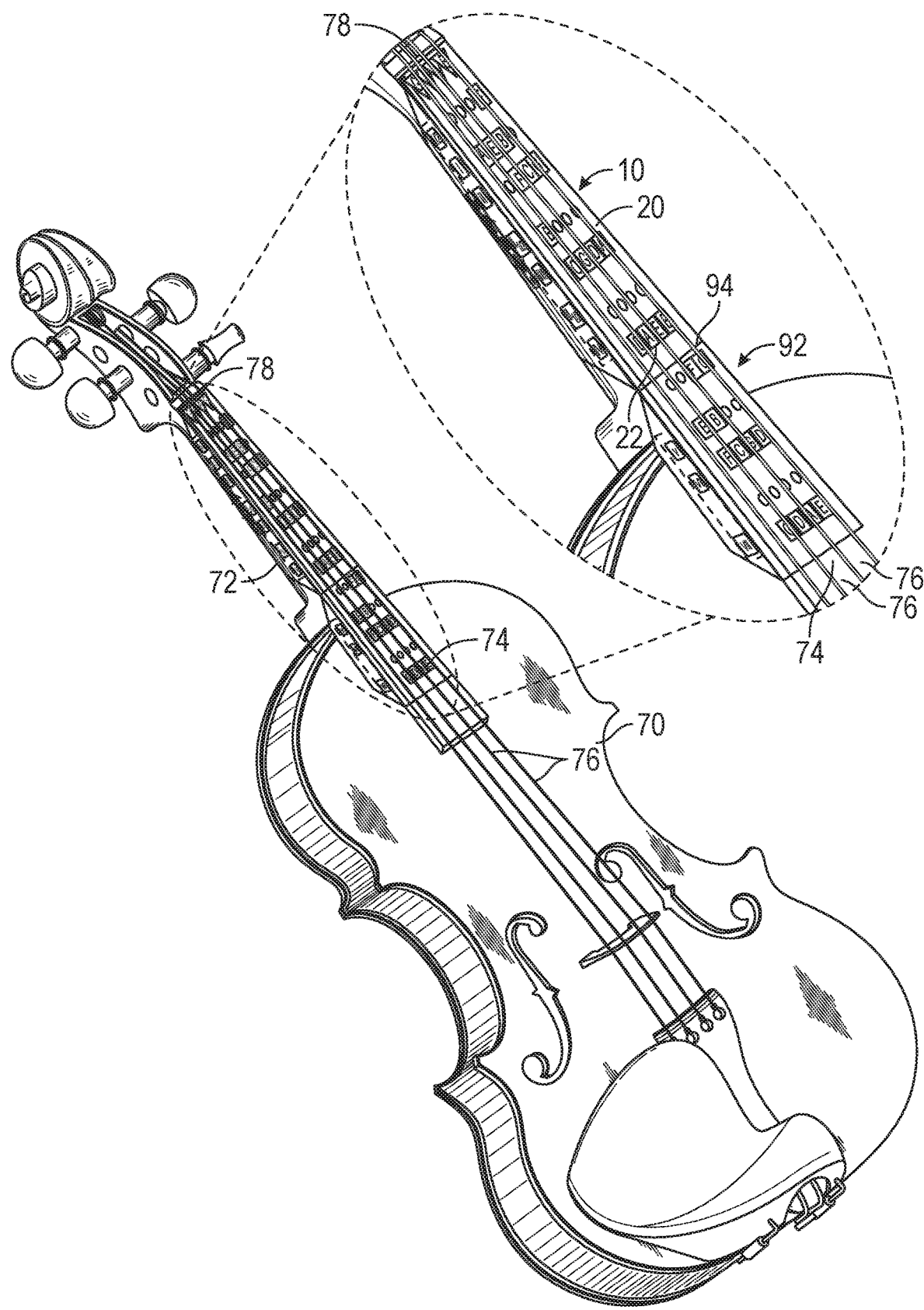
FIG. 4 is an in-use view of an example embodiment including an extension decal.

As shown in FIG. 4, an extension decal is contemplated as part of this disclosure. The extension decal 92 is additional to the stringed instrument, positionable with an uppermost edge 94 abutting the bottommost edge 28 of the decal 20 whereby finger positions are demarked at least through to the seventh position. The extension decal 92 therefore illustrates finger positions up the fingerboard 74 and comprises similar graduated position indicia and interval demarcations as previously described. However, for use in conjunction with decal 20, no string identifier indicia are disposed upon the extension decal 92.

What is claimed is:

1. An improved music fingering aid attachable to a neck of an existing stringed instrument upon a fingerboard underlying strings thereon, said improved music fingering aid comprising:
   a decal having an upper surface, a bottom surface, a topmost edge, a bottommost edge, a first side edge, a second side edge;
   a plurality of string identifier indicium disposed upon the upper surface, each of said plurality of string identifier indium disposed most proximal the topmost edge in an appropriate position to underlie a corresponding string of the existing stringed instrument, each of said plurality of string identifying indicium having:
      a brightly colored chevron having a distinct colored outline, said chevron having a first color;
      a contrasting distinctly colored letter disposed interior to the chevron, said letter corresponding to the name of the overlying string;
   a graduated position indicia series disposed upon the upper surface in parallel with the first side edge, said graduated position indicia series having a plurality of indicium demarking finger positions for movement between finger positions during play;
   a plurality of interval demarcations disposed upon the upper surface longitudinally underlying each string of the existing stringed instrument and serried transversely aligned with a corresponding one of the plurality of indicium of the graduated position indicia series, each of said plurality of interval demarcations having:
      brightly colored indicia, each of said brightly colored indicia disposed at full-stepped intervals and half-stepped intervals corresponding to minor seconds and containing a distinctly colored letter identifying each natural musical note as played when the string overlying the corresponding brightly colored square indicium is stopped at said letter;
      distinctly colored indicia identifying semitones discernible as sharps and flats between full-stepped intervals, other than natural notes playable as minor seconds;
   a directional indicium disposed upon the upper surface most proximal the first side edge, said directional indicium disposed to appear upon the neck of the existing stringed instrument adjacent to the fingerboard, said directional indicium including directional indicators significant of flats or sharps relative any particular brightly colored indicium;
   wherein the decal is sized to fit to the fingerboard of the existing stringed instrument to demark musical scales in precise semitones playable thereupon to sound near perfect pitch and tempered pitch when playing ensemble, and the uppermost edge abuts the top nut of the stringed instrument, the first side edge overlies the neck of the stringed instrument upon the side of the stringed instrument closest to the player proximal a thumb of the player, and the second side edge overlies the neck of the stringed instrument on the other side of the fingerboard, whereby each of the plurality of interval demarcations enables a player to stop the strings appropriate to produce tonal frequencies equivalent to the notes demarked.

2. The improved music fingering aid of claim 1 wherein each of the plurality of interval demarcations aligned with the indicia of the graduated position indicia series corresponding to the second position and the third position are spaced relatively closer to the immediately preceding row of interval demarcations than the other demarcations whereby tempered pitch used in instruction and ensemble play is elicited and ear-hand coordination in articulating pitch is associated.

3. The improved music fingering aid of claim 2 wherein each brightly colored indicium of the plurality of demarcations is disposed in the form of a square having a distinctly colored perimeter wherein stoppage of the overlying string centrally within the brightly colored square indicium yields 99% of perfect pitch and stoppage off-center within the brightly colored square indicium enables relative tempering of the pitch.

4. The improved music fingering aid of claim 3 wherein each distinctly colored indicium of the plurality of demarcations is disposed in the form of a uniformly colored circle wherein stoppage of the overlying string upon the center of the distinctly colored circle indicium yields a pitch a semitone apart from the center of the most proximal brightly colored square indicium underlying the same string.

5. The improved music fingering aid of claim 4 wherein the decal further comprises:
   a pair of top corner edges divergently disposed at oblique angles between the topmost edge and each of the first and second side edges respectively; and
   a pair of bottom corner edges divergently disposed at oblique angles between the bottommost edge and each of the first and second side edges respectively;
   wherein each of the top corner edges and the bottom corner edges presents a diagonal that wraps to the neck of the stringed instrument to facilitate exact placement of the decal to the fingerboard.

6. The improved music fingering aid of claim 5 wherein the decal adheres to the fingerboard by action of an adhesive disposed upon the bottom surface.

7. The improved music fingering aid of claim 6 wherein the adhesive is disposed in longitudinal strips upon the bottom surface most proximal each of the first side edge and the second side edge whereby the adhesive adheres to the neck of the stringed instrument and not the fingerboard of said stringed instrument.

8. The improved music fingering aid of claim 5 further comprising an extension decal optionally additional upon the fingerboard of the existing stringed instrument, said extension decal comprising an uppermost edge disposed to abut the bottommost edge wherein additional finger positions are illustrated at least through the seventh position.

9. The improved music fingering aid of claim 5 wherein the decal adheres to the fingerboard by static cling.

10. The improved music fingering aid of claim 8 wherein the decal further comprises a pair of side wings disposed to overlap each other on the rear side of the instrument's neck and thereat tautly fasten together.

11. An improved music fingering aid attachable to a neck of an existing stringed instrument upon a fingerboard underlying strings thereon, said improved music fingering aid disposed to fit upon the fingerboard of the existing stringed musical instrument abutting the top nut, said improved music fingering aid comprising:
an irregular octagonal shaped decal having:
an upper surface;
a bottom surface;
a topmost edge;
a bottommost edge disposed in parallel with the topmost edge;
a first side edge;
a second side edge disposed in parallel with the first side edge;
a pair of top corner edges, each of said pair of top corner edges disposed at an oblique angle connecting the topmost edge and one of the first side edge and the second side edge;
a pair of bottom corner edges, each of said pair of bottom corner edges disposed at an oblique angle connecting the bottommost edge to one of the first side edge and the second side edge;
a plurality of string identifier indicium disposed upon the upper surface, each of said plurality of string identifier indium disposed most proximal the topmost edge in an appropriate position to underlie a corresponding string of the existing stringed instrument, each of said plurality of string identifying indicium having:
a brightly colored chevron having a distinct colored outline, said chevron having a first color;
a distinctly colored letter disposed interior to the chevron, said letter corresponding to the name of the overlying string;
a graduated position indicia series disposed upon the upper surface in parallel with the first side edge, said graduated position indicia series having a plurality of indicium demarking semi-tonal steps indicative of positions used when shifting position along the fingerboard;
a plurality of interval demarcations disposed upon the upper surface longitudinally underlying each string of the existing stringed instrument and serried transversely aligned with a corresponding one of the plurality of indicium of the graduated position indicia series, each of said interval demarcations having:
brightly colored square indicia, each of said brightly colored square indicium disposed at full-stepped intervals and half-stepped intervals corresponding to minor seconds and containing a distinctly colored letter identifying each natural musical note as played when the string overlying the corresponding brightly colored square indicium is stopped at said letter;
distinctly colored circle indicia identifying semitones discernible as sharps and flats between full-stepped intervals, other than natural notes playable as minor seconds;
a directional indicium disposed upon the upper surface most proximal the first side edge, said directional indicium disposed to appear upon the neck of the existing stringed instrument adjacent to the fingerboard, said directional indicium including directional indicators significant of flats or sharps relative any particular brightly colored square indicium;
wherein the decal is sized to fit to the fingerboard of the existing stringed instrument to demark musical scales in semitones playable thereupon and the uppermost edge abuts the top nut of the stringed instrument, the first side edge overlies the neck of the stringed instrument upon the side of the stringed instrument closest to the player proximal a thumb of the player, and the second side edge overlies the neck of the stringed instrument on the other side of the fingerboard whereby each of the plurality of interval demarcations enables a player to stop the strings appropriate to produce tonal frequencies equivalent to the notes demarked and to temper the notes played when playing ensemble.

12. The improved music fingering aid of claim 11 wherein each of the plurality of interval demarcations aligned with the indicia of the graduated position indicia series corresponding to the second position and the third position are spaced relatively closer to the immediately preceding row of interval demarcations than the other demarcations whereby tempered pitch used in instruction and ensemble play is elicited and ear-hand coordination in articulating pitch is associated.

13. The improved music fingering aid of claim 11 wherein the decal adheres to the fingerboard by action of an adhesive disposed upon the bottom surface.

14. The improved music fingering aid of claim 13 wherein the adhesive is disposed in longitudinal strips upon the bottom surface most proximal each of the first side edge and the second side edge whereby the adhesive adheres to the neck of the stringed instrument and not the fingerboard of said stringed instrument.

15. The improved music fingering aid of claim 13 wherein the decal further comprises a pair of side wings disposed to overlap each other on the rear side of the instrument's neck and thereat tautly fasten together.

16. The improved music fingering aid of claim 11 wherein the decal adheres to the fingerboard by static cling.

17. The improved music fingering aid of claim 11 further comprising an extension decal optionally additional upon the fingerboard of the existing stringed instrument, said extension decal comprising an uppermost edge disposed to abut the bottommost edge wherein additional finger positions are illustrated at least through the seventh position.

18. The improved music fingering aid of claim 11 further comprising a decal having only three string identifier indicia and a plurality of interval demarcations comprising a single scale only, wherein heterogeneous instruction for a plurality of at least two different stringed instruments is facilitated by learning to play upon particular strings common to each said stringed instrument.

\* \* \* \* \*